United States Patent [19]

Schevey et al.

[11] 3,888,693

[45] June 10, 1975

[54] MULTI-PHASE RINSE AND RECOVERY METHOD

[75] Inventors: William Russell Schevey, Hawley, Pa.; Harold Freeman Jones, Dover; Burton A. Spielman, Chatham, both of N.J.

[73] Assignee: Allied Chemical Corporation, New York, N.Y.

[22] Filed: Mar. 20, 1972

[21] Appl. No.: 235,994

[52] U.S. Cl. .................. 134/10; 34/9; 134/26; 134/36
[51] Int. Cl. .................. B08b 3/08; B08b 3/10
[58] Field of Search ............. 134/10, 36, 26; 34/9

[56] References Cited
UNITED STATES PATENTS

| | | | |
|---|---|---|---|
| 1,198,045 | 9/1916 | Miller | 134/36 |
| 1,198,046 | 9/1916 | Miller | 134/36 X |
| 2,093,240 | 9/1937 | Holmquist | 134/36 |
| 2,310,585 | 2/1943 | Lawson | 134/36 X |
| 2,653,883 | 9/1953 | Thomas | 134/36 X |
| 3,386,181 | 6/1968 | Steinacker | 34/9 |
| 3,559,297 | 2/1971 | Figiel | 34/9 |
| 3,664,871 | 5/1972 | Fauber | 134/6 |
| 3,692,467 | 9/1972 | Durr et al. | 8/158 |
| 3,710,450 | 1/1973 | Figiel | 34/9 |
| 3,764,265 | 10/1973 | Mlot-Fijalkowski | 134/10 X |

*Primary Examiner*—Barry S. Richman
*Attorney, Agent, or Firm*—Michael L. Dunn; Jay P. Friedenson

[57] ABSTRACT

A method and apparatus for removing and recovering contaminating liquid from articles comprising washing the article with a liquid two phase system, one of the phases in the two phase system being immiscible with and preferably insoluble with the contaminating liquid. The remaining phase being miscible with but not the same as the contaminating liquid. The apparatus comprises a series of wash and separating tanks in conjunction with appropriate valves and pumps for utilizing the method to automatically recover contaminating liquid and return it to the process step in which it is used. This creates a balanced rinse and recovery system which prevents loss of contaminating liquid and substantially eliminates the necessity for adding new contaminating liquid to the process step in which the contaminating liquid is used.

51 Claims, 3 Drawing Figures

MULTI-PHASE RINSE AND RECOVERY METHOD

BACKGROUND OF THE INVENTION

This invention concerns a process for removing liquid contaminates from a solid surface and more particularly concerns a method and equipment for effectively washing the liquid contaminates from the surface in a minimum of space. There is a need in the art for improved methods and equipment for separating the liquid from liquid contaminated surfaces. For example, in many industries, manufactured articles are contaminated with processing solutions which must be removed prior to further processing or packaging.

Rinsing with a rinse liquid which will dissolve the first liquid and replace it with rinse liquid is the method most commonly encountered. Rinse water, for example, is frequently used to dissolve and remove water contaminated with plating salts from the surface of the article being plated. This system has decided disadvantages in that the rinse liquid, such as water, quickly also becomes contaminated with the first liquid and the surface cannot be completely cleaned due to the fact that residual rinse water containing the first liquid remains on the surface. Continuous discarding of the rinse liquid is not possible because it is expensive and presents a problem of pollution with the contaminating liquid. Rather than discard the contaminated rinse liquid, a second rinse system has been used to wash the surfaces after the first rinse. The second system will become contaminated by portions of first contaminted rinse liquid carried to the second system by the surface; a third rinse system can be set up to treat the contamination and, in this manner, a series of rinse systems have been employed. The contamination in each subsequent rinse system will be less than the contamination in each preceding system in this series; thus, the surface may be made as clean as desired by placing the required number of rinse systems in series. This is known as a cascade. It is not uncommon to encounter as many as 10 rinse systems in series which require a large amount of valuable space on a manufacturing line.

It has recently been proposed that rather than replacing the contaminating first liquid on the article surface with a less contaminating rinse liquid, the first liquid could be physically removed by washing with an immiscible liquid which would not absorb the first liquid and, therefore, would not become contaminated. Such a system does, in fact, physically remove a fairly large percentage of the contaminating first liquid held on the surface and does not replace it with a contaminated second liquid. The problem with the system, although an improvement over the cascade, is that all of the contaminating liquid is not physically removed and since there is no substitution, the portion of the contaminating liquid remaining is 100 percent of the concentration of the original contaminating liquid, thus a fairly large amount of contaminant remains on the surface.

It is also of course well known in the art that surface active agents, such as anionic, cationic and non-ionic surfactants can be added to a liquid which is miscible with the contaminating liquid so that the contaminating liquid forms an emulsion with the immiscible liquid. Such a system is unsatisfactory since the immiscible liquid rapidly becomes contaminated with emulsified contaminating liquid and in addition to the surface active agent itself may often be an undesirable contaminate. Examples of such surface active agents are long chain alkyl trimethyl ammonium halides, neutralized alkyl phosphate esters, ethoxylated phenyl rings and natural soaps.

It is, therefore, an object of this invention to provide a method for efficiently and effectively removing a contaminating liquid from the surface of an article in a minimum of space.

It is a further object of this invention to reduce waste by recovering a concentrated form of the contaminating liquid which may be recycled or otherwise used.

It is a further object of this invention to reduce pollution by liquid contaminates.

A fourth object of this invention is to provide methods capable of effectively and quickly removing contaminating liquids from article surfaces, without the use of surface active agents, which methods do not suffer the disadvantage of previously known methods used for this purpose.

A fifth object is to provide a method for collecting liquids removed from a process by an article and returning the liquid to the process in the proper amount to maintain continuous operation.

A sixth object is to preserve wash liquid in an uncontaminated condition.

Further objects and advantages of the invention will be apparent from the following description.

BRIEF DESCRIPTION OF THE INVENTION

In accordance with this invention it has been unexpectedly discovered that a contaminating first liquid is efficiently and effectively removed from a surface of an article by a method comprising washing the surface with a second liquid having a different density than the first liquid. The density of the second liquid should be either higher or lower than the first liquid to permit separation of the liquids after washing. As a practical matter, the second liquid may not dissolve more than about 50 percent of the first liquid by weight of the second liquid. In other words, the contaminating first liquid may not be over about 50 percent by weight soluble in the second liquid. It is in fact better if the solubility of the first liquid in the second liquid is as low as possible. Twenty-five percent solubility is better than 50 percent solubility. Ten percent is better than 25 percent solubility. Five percent is better than 10 percent and one percent or lower solubility of contaminating first liquid in the second liquid is better than any higher solubility in the second liquid. The reason for preferred low solubility of contaminating liquid in the second liquid will be more fully explained subsequently.

The invention further comprises washing the surface simultaneously with a third liquid while the surface is being washed with the second liquid. The third liquid is miscible with the first liquid and not over about 50 percent soluble in the second liquid by weight of second liquid. Again, a lower solubility of third liquid in second liquid is preferred. One percent or less solubility of third liquid in second liquid is better than 5 percent solubility which in turn is better than 10 percent which is better than 25 percent. Twenty-five percent solubility of third liquid in second liquid is, of course, preferred over 50 percent solubility.

The third liquid must be present in a weight percent of the second liquid greater than the weight percent solubility of the third liquid in the second liquid and in practical application less than about 400 percent by weight of second liquid. The third liquid may, of course, be present in any percentage between these limits. For example, the third liquid may be present in 1, 5, 10, 50, 75, 100 or 200 percent by weight of second liquid.

As previously discussed, the invention comprises and may consist essentially of a method and apparatus for removing a contaminating first liquid from a surface of an article by washing the surface with a mixture of mutually undissolved second and third liquids. The mutually undissolved third liquid is miscible with the contaminating first liquid & the second liquid should be substantially insoluble in contaminating first liquid. The mutually undissolved liquids should be of different densities so that they can be easily separated after they are used for washing the surface. The first liquid may be any liquid which is a contaminant of the article surface under the particular circumstance. The contaminating liquid, for example, might be a water miscible alcohol, such as ethanol or isopropanol, an aliphatic hydrocarbon, an undesirable aqueous electrolyte solution such as a solution of salt, alkali or acid, a high boiling halogenated hydrocarbon or a solution of mutually soluble liquids.

The second liquid should be substantially insoluble in the first liquid and might, for example, be water, water miscible alcohol an aliphatic hydrocarbon, halogenated hydrocarbon or a solution of mutually soluble compounds.

When the contaminating liquid is a polar compound such as water or a water solution, the second liquid is preferably selected from the group consisting of 1,1,2-trichloro-1,2,2-trifluoroethane, trichloromonofluoromethane, tetrachlorodifluoroethane, 1,2,4-trichlorobenzene, 1,2,3-trichlorobenzene, methylene chloride, carbon tetrachloride, carbon tetrabromide, chloroform, trichloroethylene, bromoform, perchloroethylene, heptane and isooctane. The preferred liquids due to their lack of flammability, fairly low toxicity and boiling point are 1,1,2-trichloro-1,2,2-trifluoroethane and perchloroethylene.

When the contaminating liquid is a non-polar compound such as oil, the second liquid is preferably selected from a group of compounds which are insoluble in the non-polar compound. Examples might be water, lower alcohols, water solutions, ketones, lower ethers or mutual solutions of these liquids.

The third liquid should be miscible with the first contaminating liquid, should not be miscible witth and should preferably be insoluble in the second liquid. The third liquid should also have a different density than the second liquid so that the liquids may be separated after they are used for washing. The third liquid may, of course, have higher or lower density than the second liquid to permit separation. Formation of an emulsion between the first and second liquids or second and third liquids is undesirable since the liquids cannot then be easily separated and contamination of the same occurs. Thus to prevent formation of such emulsions, the system i.e. all liquids, should be substantially free from surface active agents although small quantities of such agents are permissible provided they do not cause emulsification in the systems.

The third liquid permits a dilution of the contaminating first liquid; therefore, the third liquid should not be identical with the firstt liquid so that dilution will be permitted. Dilution would, of course, not occur if the contaminating liquid were replaced by the same liquid.

If the first liquid were an aqueous electrolyte solution, the third liquid for example, could be a water miscible alcohol, could be water or could comprise a more dilute electrolyte solution.

Washing of the article surface may be by any suitable means such as dipping the article into an agitated mixture of second and third liquids, spraying a mixture of second and third liquids through a common nozzle against the surface of the article or simultaneously spraying the second liquid against the article surface through one nozzle while spraying the third liquid against the article surface through a second nozzle.

After washing the article surface with the mixed liquids, the liquids may be collected and separated into a liquid phase containing primarily second liquid and a liquid phase containing third liquid and contaminating first liquid. The second liquid phase may be recycled as second liquid and the first and third liquid phase may be recycled as third liquid until the efficiency of this phase is substantially reduced by a high concentration of contaminating first liquid.

It has also been unexpectedly discovered that prewashing the article surface with a fourth liquid which reduces the concentration of the first liquid on the article greatly increases the efficiency of the process and further reduces the number of required cascade rinse tanks after washing the surface with the mixture of liquids in accordance with the disclosed process. The wash may be by immersion or may take the form of "fog" or "flood" comprising a diluting fourth liquid. "Fog" means that the fourth liquid is a low volume spray or mist of fine droplets or a steady stream. The fourth liquid may be the same or different from the third liquid but should process a high solubility for the first contaminating liquid. Low volume would include a range of from about 0.01 to 10 percent by weight of a subsequent second and third liquid spray in unit time; whereas, a "flood" would be a volume comparable to the subsequent second and third liquid spray.

The invention futher includes an apparatus which comprises and may consist essentially of, in combination, a sump adapted to contain a liquid, means for suspending an article within the sump which may be a clamp or a moving chain, means for washing as by spraying substantially all surfaces of the suspended article with immiscible liquids which can include a mixing nozzle, means for separating the immiscible liquids which collect in the bottom of the sump into distinct liquid phases which means can, for example, be a quiescent zone in a container or second sump which will permit separation by gravity, means for removing liquid which separates as one phase, and means for recycling liquid which separates as another phase to the spray means as by a pump hooked by a feed line to said liquid and by a tube to the spray means.

The apparatus may also be provided with a cooling means such as a refrigeration unit in the sump for cooling the vapor space above the collected liquid to reduce liquid loss by evaporation. A second such cooling means may be provided in the second sump. The means for spraying substantially all surfaces of the suspended article with immiscible liquids may include a means such as an agitator or pump for mixing two or more liquids and feeding the mixture as charge to the spray means. Alternatively means might also be provided for simultaneously spraying discrete liquids through separate nozzles onto the article and means can be provided for creating a fog or a flood around the suspended article as previously mentioned.

The apparatus may also include a prewash treatment tank in which the article is subjected to a prewash while it is suspended within the tank, means to remove the article after the prewash and to suspend the article within the first sump, and means to transfer a separated liquid phase to the treament tank.

Further discussion of specific means employed in the apparatus will be found subsequently.

PREFERRED EMBODIMENTS OF THE INVENTION

Figure 1:
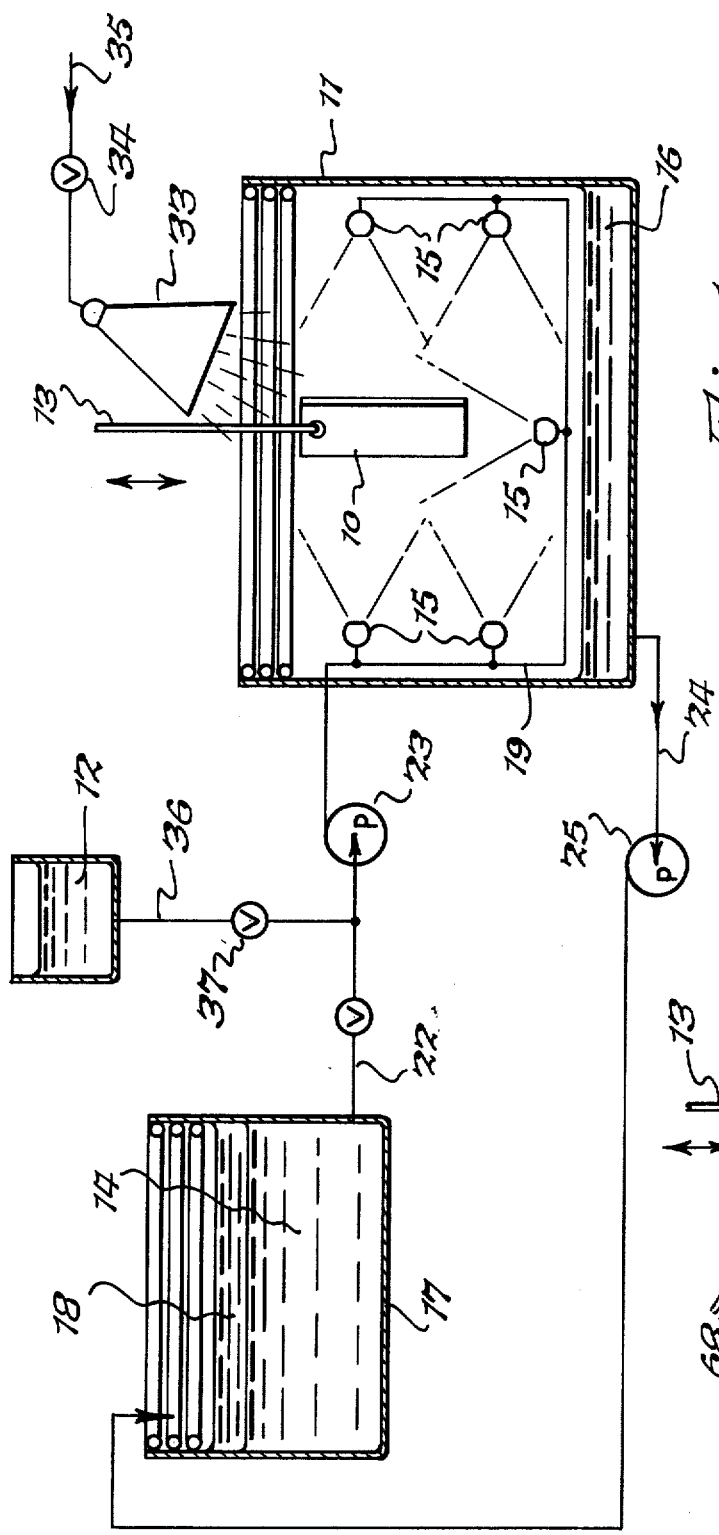
FIG. 1 is a schematic view of a preferred embodiment of the apparatus of the invention.

In one preferred embodiment of the invention, the method comprises and may consist essentially of removing a water miscible liquid contaminant from a non-absorbent article by simultaneously washing the non-absorbent article possessing a surface contaminated with a water miscible first liquid, with a second liquid having a different density than the first liquid and in which the first liquid is not over 10 percent soluble by weight of second liquid, and with water. The water is likewise not more than 10 percent soluble in the second liquid and is present in a weight percent of the second liquid higher and its weight solubility in the second liquid permitting displacement of the contaminating first liquid from the article.

In the preferred embodiment the displaced first liquid, second liquid and water are collected and separated into an aqueous phase and a second liquid phase in a separation zone. The second liquid and aqueous phases are maintained at a temperature below their boiling point to prevent vapor loss and to increase efficiency of separation. The second liquid phase is removed from the separation zone and recycled as second liquid wash component. Waste of second liquid is, therefore, prevented, thus reducing both cost and pollution. Similarly, the aqueous phase may be reclaimed and recycled as water wash component until the concentration of contaminant in the water becomes high enough to make the use of the contaminated water ineffective as wash solution.

The contaminated aqueous phase may then be returned to the processing step where the contaminant was used or the contaminant may be otherwise reclaimed, for example, by evaporation of water. The contaminant in the system is automatically concentrated, therefore, reuse or reclamation is less expensive and easier.

When the contaminating first liquid is acidic or basic, whether aqueous or otherwise, a neutralizin agent may be incorporated into the system to neutralize the contaminant. Acidic or basic contaminating solutions are frequently encountered on articles removed from plating systems such as those encountered in chromium, copper or nickel plating baths. Various other additives may be incorporated, such as reducing or oxidizing agents.

For example, in a chrome plating system aqueous solutions of hexavalent chrome remain on the chrome plated article surfaces. Incorporation of methanol or aqueous sodium metabisulfite solution into the third liquid will reduce hexavalent chrome to the less harmful trivalent chrome. Harmful cyanide residues may be destroyed by incorporating oxidizing agents such as hydrogen peroxide, ozone or sodium hypochlorite.

In a second preferred embodiment, the contaminating first liquid comprises water which may have any other composition in solution and the method comprises and may consist essentially of washing the non-absorbent surface holding the contaminant with a mixture of a second liquid and a third liquid. The second liquid has a different density than either the first or third liquid or a mutual solution of the first and third liquids. Neither the first nor third liquids or a mutual first solution of the first and third liquid are more than 10 percent, and preferably less than 5 percent, soluble in the second liquid by weight of second liquid. The third liquid is a solution which is miscible with the first liquid and comprises and preferably consists essentially of a dilution of the first liquid. The third liquid is present in the mixture in a percentage greater than the percent solubility of the first solution in the second liquid.

Subsequent to washing with the above mixture, the surface may be further washed with a second solution containing less than the maximum concentration of the first liquid which maximum concentration would prevent further removal of first liquid from the surface. A plurality of these subsequent washings in subsequent work zones is contemplated. These subsequent wash zones, for example, the second wash zone may supply all or part of the second solution requirements.

After washing with the second solution, the surface may be further washed with water.

Prior to the first washing with the mixture of second and third liquids, the article surface may be prewashed with a dilute solution of the aqueous liquid being removed, which prewashing reduces the number of subsequent washes required after washing with said mixture.

After washing with the mixture, which may be formed prior to or during washing, the displaced aqueous first liquid, the second liquid and the first solution may be collected and placed in a separation zone and separated into an aqueous phase and a second liquid phase. The separated second liquid phase may be removed from the separaton zone and recycled as a second liquid component of the wash mixture. The aqueous phase may be recycled as the first solution wash component. When both components are recycled together, there is, of course, no need for separation into separate phases. In order to prevent vapor loss, the temperature of the second liquid entering the separation zone may be maintained below its boiling point. The recycling may be continued until a predetermined concentration of the aqueous liquid being removed is obtained as the separated aqueous phase at which time the aqueous phase may be discarded, recycled to the manufacturing process or otherwise used.

The advantages of the disclosed process for removing liquid contaminants from a solid surface will become apparent from a comparison of the following wash systems for surfaces having the same amount of the same contaminant.

EXAMPLE 1

Cascade System

A chromium plating tank contains a plating solution having a concentration of 200 grams of chromium trioxide ($CrO_3$) per liter of water, (hereinafter referred to as Liquid 1 ). Articles being removed from the tank carry five liters per hour of Liquid 1 from the tank. The articles are then washed in an aqueous solution of 25 percent Liquid 1 and 75 percent water. The articles washed in this solution then carry 5 liters per hour of the solution from the wash tank and $25\% \times 5 = 1.25$ liters of Liquid 1 per hour are carried to the next wash tank. The first wash tank in the cascade is therefore only 75 percent efficient in removing Liquid 1. The concentration of Liquid 1 is high in the first wash solution due to the carry out of Liquid 1 by preceeding articles. Four more series wash tanks at 75 percent efficiency are needed to obtain 0.02 liters per hour of contaminant on the article surfaces.

EXAMPLE 2

Immiscible Liquid Wash System

Articles being removed from a plating tank carry 5 liters per hour of Liquid 1 (as defined in Example 1l) from the tank. The articles are then washed in perchloroethylene (hereinafter referred to as Liquid 2). After washing with Liquid 2 it is experimentally determined that 0.5 liters per hour of Liquid 1 are carried through the wash tank and 4.5 liters per hour are physically removed from the article surface by Liquid 2. The system is, therefore, 90 percent efficient and only three series cascade tanks at 75 percent efficiency would reduce the contamination of first liquid to 0.008 liters per hour on the article surface.

EXAMPLE 3

System of the Invention Using Water as the Third Liquid

Articles being removed from a plating tank carry 5 liters per hour of Liquid 1 (as defined in Example 1) from the tank. The articles are then washed in a mixture of 99 percent perchloroethylene and 1 percent water (hereinafter referred to as the second and third liquids, respectively). After washing, it is experimentally determined that 0.1 liters per hour of Liquid 1 are carried through the wash tank and 4.9 liters per hour are removed from the articles by the wash mixture. The system is, therefore, 98 percent efficient and only one cascade tank at 75 percent efficiency would reduce the contamination of first liquid to 0.1 liters per hour on the article surface.

EXAMPLE 4

System of the Invention Using a Dilute Solution of Liquid 1 as the Third Liquid The system of Example 3 is used except the third liquid is an aqueous solution of 25 percent Liquid 1 and 75 percent water. After washing it is experimentally determined that 0.2 liters per hour of Liquid 1 are carried through the wash tank and 4.8 liters per hour are removed from the article by the wash mixture. The system is, therefore, 96 percent efficient and three series cascade tanks at 75 percent efficiency would reduce the contamination by first liquid to 0.003 liters per hour on the article surfaces.

EXAMPLE 5

System of the Invention with Prewash

Articles being removed from a plating tank carry 5 liters per hour of Liquid 1 (as defined in Example 1) from the tank. The articles are then washed with an aqueous solution of 25 percent Liquid 1 and 75 percent water and then with a mixture of Liquid 2, as defined in Example 2, and an aqueous solution of 7 percent Liquid 1 and 93 percent water. After washing with the mixture it is experimentally determined that 0.5 liters per hour of Liquid 1 are carried through the wash tank. Both wash operations may take place in the same tank by means of a first and second wash spray. Only two more series cascade tanks at 75 percent efficiency would reduce the contamination by first liquid to 0.003 liters per hour on the article surfaces.

EXAMPLE 6

The system of Example 4 is followed, except 1,1,2-trichloro-1,2,2-trifluoroethane is used instead of perchloroethylene. The results are substantially identical.

EXAMPLE 7

The system of Example 4 is followed except subsequent to washing with the mixture, the mixture is collected and placed in a separation zone to permit the formation of an aqueous liquid phase and a second liquid phase. The second liquid phase is then removed and recycled as the second liquid in the wash system and the aqueous liquid phase, which now contains even more of the first liquid, is returned to the plating tank.

EXAMPLE 8

Metallic parts which are to be subjected to welding operations were previously coated with a light machine oil to prevent corrosion. In order to remove the oil, the parts are washed in a mixture of 98 percent ethylene glycol as the second liquid and 2 percent isooctane as the third liquid. After washing about 97 percent of the oil film has been removed and replaced by ethylene glycol and isooctane. A warm air stream is then passed over the parts to evaporate the ethylene glycol and isooctane, leaving a clean dry surface. The air system may then be passed through a condenser to condense and recover the ethylene glycol and isooctane which may be recycled. When the isooctane begins to hold enough oil contaminant to become inefficient in replacing the oil film, it may be separated from the ethylene glycol by liquid phase separation as previously discussed and the oil, isooctane solution can be distilled to recover reuseable isooctane. The isooctane may, of course, be replaced by any suitable liquid which is volatile and relatively insoluble in the alcohol such as another hydrocarbon or a halogenated hydrocarbon. Any immiscible polar liquid may replace the ethylene glycol, such as water. Water is not preferred; however, due to its catalytic effect on surface corrosion of metallic parts containing iron.

While not wishing to be bound by any particular theory, the following explanations are offered for the marked improvement of removal of liquid contaminates from a surface by the process herein disclosed. A comparison of what is believed to occur in removing contaminating liquid from a surface holding a given amount of such a liquid is as follows:

In the cascade system all contaminating liquid is believed to be removed by dissolving the contaminating liquid in a wash liquid and replacing it by the wash liquid. If, as a practical matter, it were possible to use nothing but a wash liquid which is free from the contaminating first liquid, or in other words a clean wash liquid, washing with the clean wash liquid should remove substantially all of the first liquid.

Washing with a clean wash liquid is, of course, not possible in a batch wash operation where the surface is dipped into a specific volume of clean wash liquid since contaminating liquid will enter the batch from the surface and the wash liquid will not remain clean. A portion of the contaminated wash liquid will then be removed from the batch by clinging to the removed surface. A series of surfaces holding contaminating first liquid entering the batch will soon cause serious contamination of the wash liquid and efficiency of the wash operation will drop drastically due to the fact that highly contaminated wash liquid clings to the surface as it is removed. The physical quantity of clinging wash liquid is usually equal to the original quantity of contaminating liquid entering the wash.

It is theoretically possible that the surface could be cleaned by a spray of a clean wash liquid since the sprayed material need not have previously contacted contaminating material. Such a spray operation, however, is not practical since subsequent to the spray washing, the contaminated wash liquid must be discarded. The amount of contaminant in the used wash liquid is great enough to prevent further use as a wash liquid which will completely clean the surface, yet is not great enough to permit removal of the contaminant, for example, by distillation, without prohibitive expense. Discarding the liquid is equally impractical since the cost of a continuous loss of wash liquid and the loss of possibly valuable contaminant must be considered. Additionally, discarding the used contaminated wash liquid presents a serious pollution problem. In actual spray operations, therefore, the used wash liquid is recycled to the first spray wash and a subsequent spray wash is set up to further remove contaminants from the surface. The spray cascade system, therefore, suffers from the same problem as the batch cascade system which is low efficiency usually not exceeding 75 percent.

The recently discovered insoluble liquid wash system is an improvement over the cascade system in that the insoluble liquid physically removes the contaminating liquid from the surface. Since the insoluble liquid does not dissolve the contaminating liquid, it thus does not itself become contaminated. The insoluble liquid can physically remove as much as 90 percent of the contaminating liquid, thus may be 90 percent efficient. The main problem with the insoluble liquid system is that ten percent or more of the contaminating liquid remains on the surface which must be removed by a subsequent cascade wash.

It has now been discovered that washing with a mixture of a liquid insoluble with the contaminating liquid and a liquid miscible with the contaminating liquid can result in efficiencies as high as 98 percent on the first wash and as high as 96 percent even when the miscible liquid contains as much as 25 percent contaminating liquid. While not wishing to be bound by a particular theory, it is believed that the newly discovered process combines the advantages of both the cascade method and the insoluble liquid method. In the new process, it is believed that the immiscible liquid physically removes up to 90 percent of the contaminating liquid while the remaining 10 percent contaminate is at least partially replaced by the miscible liquid, thus as little as 4 percent of the original contaminating liquid remains on the surface even when the miscible liquid contains as much as 25 percent contaminating liquid. A miscible liquid containing 25 percent contaminating liquid when used in the cascade system would be only 75 percent efficient since there is no physical removal but replacement by a 25 percent contaminant.

It should be pointed out that the requirements of the wash liquids in subsequent rinse tanks vary with the particular method used. In the cascade system, it is clear that the subsequent wash liquids will be effective if they contain less contaminant than the percentage concentration of contaminant present in the previous wash liquid. For example, if a wash liquid containing 25 percent contaminating liquid is used in the first wash, a second wash liquid containing less than 25 percent contaminating liquid will effect further removal of contaminant in a second wash.

When either the immiscible liquid system or the system of the invention is used, the permissible concentration of contaminating liquid in the wash liquid in a subsequent cascade type tank to effect further removal of contaminating liquid is not as easily determined.

In the immiscible liquid process a given amount of contaminating liquid enters the process and a percentage of that given amount is physically removed by the immiscible liquid. For example, 5 liters per hour of contaminating liquid enters the immiscible liquid system on surfaces to be washed, of which 4.5 liters are physically removed by the immiscible liquid from the surfaces leaving 0.5 liters per hour of 100 percent concentrated material on the surfaces. When the surface is further washed in a cascade type tank the surface will again hold a larger amount of cascade tank wash liquid which is soluble with the contaminating liquid.

For example, if the contaminating liquid is an aqueous salt solution, subsequent washing by an aqueous bath will cause the surfaces to again remove about 5 liters per hour of aqueous liquid from the subsequent wash even though only 0.5 liters per hour were carried into the subsequent wash from the immiscible liquid wash, which means that the 5 liters per hour of liquid leaving the subsequent wash must contain less of the original aqueous salt solution than the 0.5 liters carried into the subsequent wash in order to effect further removal of the contaminating liquid from the surface. In other words, carry in $K_1$ divided by carry out $K_2$ equals the percent concentration in the subsequent wash liquid which will effect no change $C_{NC}$ divided by the concentration of contaminating liquid on the surface which leaves the immiscible or insoluble liquid wash and carried into the subsequent cascade type wash $C_{K_1}$ or $$\frac{K_1}{K_2} = \frac{C_{NC}}{C_{K_1}}$$

which in this case where $K_1$ equals 0.5 l., $K_2$ equals 5 and $C_{K_1}$ equals 100 percent is $$\frac{0.5}{5} = \frac{C_{NC}}{100}$$

and $$C_{NC} = 10\%$$

The concentration of contaminant in the subsequent wash liquid must therefore be less than 10 percent to effect further removal.

It has been found that the same formula applies to the method of the invention except that due to exchange of third liquid with the first contaminating liquid, the $C_K$ concentration is always less than 100 percent.

The method of the invention has an additional advantage in that the contaminating liquid, such as plating solution, which is removed from a system, such as a plating bath can be collected, separated, and returned to the system. Since the amount of contaminating liquid removed by the surfaces is exactly equal to the amount required to return the system to its original condition, the system is automatically balanced. Evaporation losses from the system can be calculated and replaced in the form of third miscible liquid which is water in the case of a plating bath.

Figure 2:
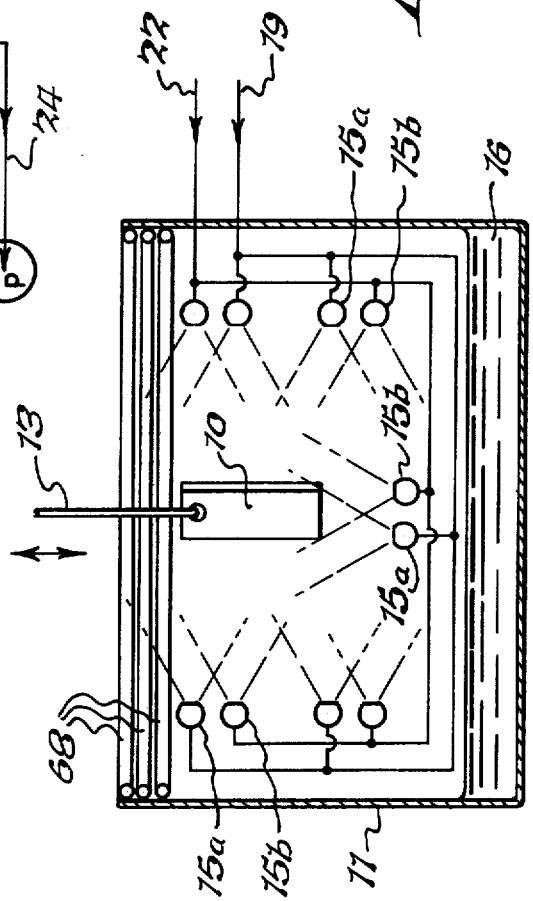
FIG. 2 is a schematic view of an alternative embodiment of the wash tank or sump.
Figure 3:
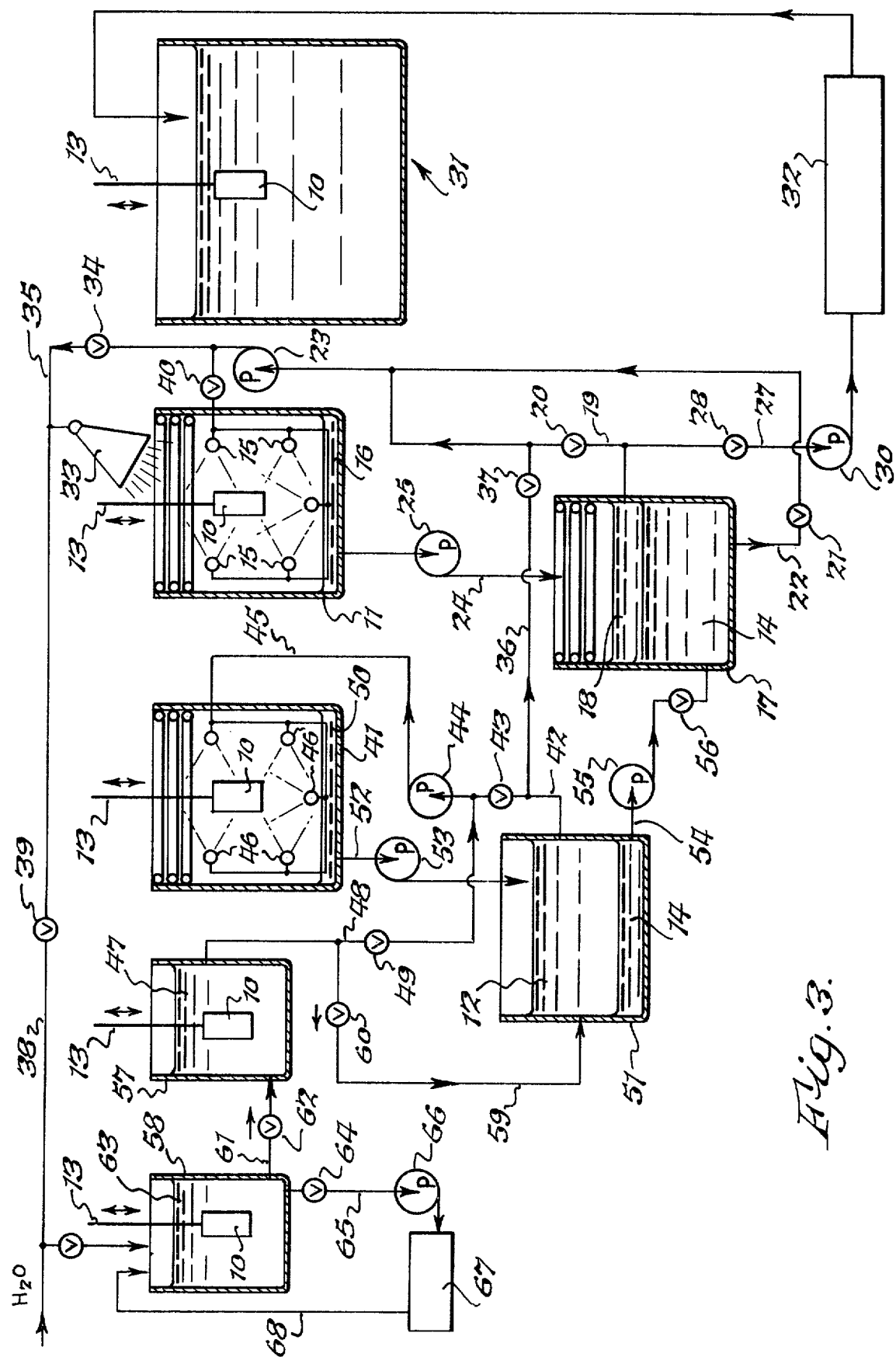
FIG. 3 is a schematic view of a preferred embodiment of the apparatus of the invention incorporating optional features.

Referring now to the drawings, FIGS. 1, 2 and 3 show a schematic of a preferred embodiment of the apparatus of the invention. Article 10, which may be any article which is contaminated with an undesirable liquid, is suspended within sump 11, container or tank 11 by means of a moveable support 13. The moveable support may be any suitable structure such as a clamp secured to a moving chain which is raised and lowered by a series of sprockets or a belt conveyor to which is attached an air cylinder for raising and lowering a clamp holding article 10. When in sump 11, article 10 is sprayed with a mixture of liquids 12 and 14 through nozzles 15. Liquid 14 is likewise relatively insoluble in the contaminating liquid. The spray of immiscible liquids removes a substantial quantity of contaminating liquid clinging to article 10 as previously discussed. The mixture of liquids 12, 14 and contaminating liquid then collects at the bottom of sump 11 which collection is designated as liquid 16 in FIGS. 1, 2 and 3.

As shown in FIGS. 1 and 3 a container, tank or sump 17 is provided to which liquid mixture 16 is directed by means of pipe line 24 and pump 25. If sump 17 is positioned below sump 11 liquid 16 can flow through line 24 to sump 17 by means of gravity. Sump 17 provides a quiescent zone for liquid 16 which permits liquid 16 to separate into two liquid phases 18 and 14. Liquid phase 14 is substantially identical with liquid 14 and as shown in FIGS. 1 and 3 may be recycled through line 22 by means of pump 23 to nozzles 15.

Liquid 18 which contains both liquid 12 and contaminating liquid may likewise be recycled to nozzles 15 through line 19 and pump 23 when valve 20 is open as seen in FIG. 3. Liquid 18 may continue to be recycled until the concentration of contaminating liquid becomes so high that the efficiency of removal of contaminating liquid from article 10 is substantially reduced. Valve 20 may then be closed and liquid 18 having a high concentration of contaminating liquid may be returned through line 27, valve 28, and pump 30 for treatment or reuse in processing as in plating tank 31 shown in FIG. 3. Prior to addition to plating tank 31 or prior to other use or disposal, liquid 18 may be treated as by optional concentration unit 32. Additional liquid 18 may then be permitted to collect in sump 17.

As best seen in FIG. 3, the above apparatus may be further sophisticated by functional additions. For example, article 10 may be prewashed in sump 11 or optionally in a prewash treatment tank (not shown), with a fog provided by fogger unit 33. The fogging liquid provided to unit 33 may optionally be from several sources. The fogging liquid may be water supplied from a clean water or other pure miscible liquid supply, not shown, through line 38 and open valve 39. The fogging liquid may likewise be liquid 18 supplied through line 19, valve 20, pump 23, valve 34 and line 35. Valve 40 is closed to prevent flow to nozzles 15. The fogging liquid can also optionally be liquid 12 supplied through line 36, valve 37, pump 23, valve 34 and line 35. Any proportional mixture of liquids 12, 18 and water may be supplied to unit 33 when valves 20, 37, 39 and optionally 34 are all open and are proportional operating valves.

A flood of liquid which is miscible with the contaminant on article 10 may be supplied through nozzles 15 prior to washing with a mixture of immiscible liquids. When valve 21 is closed to prevent immiscible liquid 14 from flowing to nozzles 15, the flooding liquid may be liquid 18 supplied through line 19, valve 20, pump 23 and valve 40. Valve 34 is closed to prevent flow to unit 33. The flooding liquid may likewise be liquid 12 supplied through line 36, valve 37, pump 23 and valve 40. When valves 20 and 37 are both open and proportional operating valves, the flooding liquid may be any predetermined mixture of liquids 12 and 18.

After any optional prewash through unit 33 or nozzles 15, valve 21 is opened and immiscible liquid 14 passes through line 22, valve 21, pump 23 and valve 40 to nozzles 15. Simultaneously liquid 12 or 18 or a mixture of liquids 12 and 18 as previously discussed pass through pump 23 and valve 40 to nozzles 15; thus article 10 is washed with a mixture of immiscible liquids 14, 12 and 18. Liquids 12 and 18 though immiscible with liquid 14 are miscible with each other and with the contaminating liquid. All liquids which are used to wash article 10 in sump 11 collect in the bottom of sump 11 and are designated as liquid mixture 16 in FIGS. 1, 2 and 3 of the drawings. Liquid 16 then passes through pump 25 and line 24 to sump 17 for separation into liquids 14 and 18.

After washing with immiscible liquids, article 10 is lifted from sump 11 by any suitable means such as a vertically oriented moving chain or air cylinder and transported to a position above container, tank or sump 41 by any suitable transporting means such as a chain or other conveyor. Article 10 is then lowered into sump 41 by any suitable lowering means, such as a vertically oriented moving chain or air cylinder. In sump 41 article 10 is sprayed with a second wash liquid miscible with the contaminating liquid for the double purpose of further diluting and removing the contaminant and for physically removing immiscible liquid 14 which has been retained on article 10.

The second wash liquid used in sump 41 may be liquid 12 which is supplied through line 42, valve 43, pump 44 to line 45 and through nozzles 46 to spray article 10. The second wash liquid may also be liquid which is supplied through line 48, valve 49, pump 44 and line 45 to nozzles 46. The second wash liquid may be a mixture of miscible liquids 12 and 47 when both valves 43 and 49 are open. The proportions of liquids 12 and 47 in the mixture may be precisely controlled when valves 43 and 49 are proportional operating valves. The second wash liquid, removed contaminating liquid and removed immiscible liquid 14 collect in the bottom of sump 41 and is designated as liquid mixture 50 in FIG. 3. Mixture 50 is removed from sump 41 to container, tank or sump 51 by means of line 52 and pump 53. In sump 51, the mixture separates into two phases designated as 12 and 14. Phase 14 is substantially identical with immiscible liquid 14 and is removed to sump 17 through line 54, pump 55, and valve 56 where it is added to the liquid 14 found in sump 17. Phase 12 is reused as liquid 12 in the operation previously discussed.

After the washing operation in sump 41 is completed article 10 is lifted from the sump by suitable lifting means and transported by suitable conveying means to a position above container, sump or tank 57 and lowered into tank 57 by any suitable lowering means. Examples of suitable lifting, conveying and lowering means have been previously given.

In tank 57 article 10 is immersed in liquid 47 to effect substantially complete substitution of liquid 47 for any contaminating liquid remaining on article 10. In order to provide more efficient removal, agitation may be provided if desired. Article 10 is then removed to container, sump or tank 58 for further washing by immersion in liquid 63. Subsequent containers may also be provided for additional washing if necessary. Tank 57 is connected by means of line 59 and check valve 60 to sump 51 so that if the level and thus the hydrostatic pressure of the liquid in sump 51 falls below the hydrostatic liquid pressure in tank 57, liquid form tank 57 will automatically flow into sump 51 when tank 57 and sump 51 are on the same level, thus replenishing the supply of liquid in sump 51. Tank 58 is similarly connected to tank 57 by means of line 61 and check valve 62. When tanks 57, 58 and sump 51 are on different levels a more complicated means for maintaining liquid levels must be adopted, for example, by floats and pumps.

The last tank in the wash tank series, represented by tank 58 in FIG. 3 may be provided with a purifier to maintain a substantially clean liquid in the last tank. For example, when the contaminating liquid is an aqueous electrolyte, the contaminant may be removed thorugh valve 64, line 65, pump 66 to deionizer 67 which removes electrolyte impurities before the liquid is returned to tank 58 through line 68.

As an alternative embodiment it is not necessary that an immiscible liquid premixture be sprayed through the nozzles as shown in FIGS. 1 and 3. The immiscible liquids may be sprayed separately as shown in FIG. 2 onto article 10 through separate nozzles 15a and 15b and the liquids thus mixed in the air as a spray and on the surface of article 10.

In order to prevent vapor loss of liquids any or all tanks, containers and sumps may be provided with a cooling means such as cooling coils 69 to cool the vapor space above the liquids and the liquids themselves thus preventing vapor loss and increasing the efficiency of the phase separation.

In the preferred embodiment of the above disclosed apparatus, the system is completely balanced so that a maximum of clenaing is obtained with practically no loss of contaminating material. When, for example, tank 31 is a plating tank, certain liquid losses occur from the tank. These losses are pure salt free liquid losses from evaporation and liquid drag out or carry out by article 10 being removed from tank 31. In order to be completely balanced the water or pure liquid input must equal the liquid loss from tank 31 by evaporation and drag out. Therefore, when the pure liquid is water as shown in FIG. 3 the water input to the prewash and tank 58 must substantially equal the loss from tank 31. In the preferred embodiment no pure water is used in the prewash. The liquid 63 flowing to tank 57 must therefore substantially equal the losses from tank 31, and flow from tank 57 to sump 51 through lines 59 and through sump 41 must likewise be substantially equal to the losses from tank 31 and the flow from sump 51 through line 36 to sump 17 must also be substantially equal to the losses from tank 31 and the amount of contaminated liquid returned to tank 31 from sump 17 will, therefore, be substantially equal to liquid losses by evaporation and drag out and the amount of plating salts dragged out by article 10 will be the amount needed to maintain the proper concentration in plating tank 31 since the salts returned are the salts that were originally lost.

The system is actually fairly simple to balance. For example, the amount of water entering the system can be controlled by metering valves to equal the amount of water calculated to be lost from tank 31 and tanks 57, 58 and sump 51 are automatically balanced by check valves. More or less liquid 47 can be sent through the nozzles 46 in sump 41 by adjusting valve 49. The amount of flow to sump 51 will, however, remain equal to the amount of water entering the system because of the check valve action provided the flow through valve 49 is kept lower than the flow of water entering the system.

Similarly, valve 37 is adjusted until the flow through valve 37 is substantially equal to the flow of water entering the system. A similar adjustment is made to valve 28 which permits liquid 18 to be returned to tank 31 at the same rate as water enters tank 58.

What is claimed is:

1. The method for removing a contaminating first liquid from a surface of an article which comprises
   a. washing said surface with a second liquid having a different density than said first liquid, said first liquid being not over 10 percent by weight soluble in said second liquid;
   b. simultaneously washing said surface with a third liquid comprising water which is miscible and soluble with, but not the same as, said first liquid and not over about 10 percent by weight soluble in said second liquid, said third liquid being present in a weight percent of said second liquid greater than the weight percent solubility of said third liquid in said second liquid and less than about four hundred percent by weight of said second liquid thereby displacing said first liquid from said surface, all liquids being substantially free from surface active agents;
   c. collecting the displaced first liquid, the second liquid and the third liquid, subsequent to said washing, and causing said liquids to separate into a second liquid phase and a first and third liquid phase; and
   d. recycling said first and third liquid phase as third liquid.

2. The method according to claim 1 wherein said third liquid consists of water.

3. The method according to claim 1 wherein said first liquid is an aqueous electrolyte solution.

4. The method according to claim 3 wherein said third liquid is a more dilute solution of said first liquid.

5. The method for removing a water miscible liquid contaminant from a non-absorbent article which comprises:
   a. simultaneously washing a non-absorbent article possessing a surface contaminated with a water-miscible first liquid, with a second liquid having a different density than the first liquid and in which the first liquid is not over 10 percent by weight soluble, and with water, the water being not more than 10 percent soluble in said second liquid by weight of second liquid and being present in a weight percent of said second liquid higher than the weight percent solubility of water in said second liquid, said first liquid not being uncontaminated water, thereby displacing said first liquid from the article,
   b. collecting the displaced first liquid, second liquid and water,
   c. causing the displaced first liquid, second liquid and water to separate into an aqueous phase and a second liquid phase in a separation zone,
   d. removing from the separation zone the second liquid phase, and
   e. recycling the second liquid removed from the separation zone as second liquid wash component in accordance with step (a).

6. The method according to claim 5 in which the water present in said second liquid is in an amount between about 1–10 percent by weight of said second liquid.

7. The method according to claim 5 in which the second liquid and water are sprayed through separate nozzles onto the non-absorbent article.

8. The method according to claim 5 in which the second liquid and water are sprayed through common nozzles onto the non-absorobent article.

9. The method according to claim 5 in which second liquid entering the separation zone is maintained at a temperature below its boiling point.

10. The method according to claim 5 in which the article, before being subjected to wash treatment is pre-rinsed by exposure to a fog comprising water.

11. The method according to claim 5 in which the second liquid is selected from the hgroup consisting of 1,1,2-trichloro-1,2,2-trifluoroethane, trichloromonofluoromethane, tetrachlorodifluoroethane, 1,2,4-trichlorobenzene, 1,2,3-trichlorobenzene, methylene chloride, carbon tetrachloride, carbon tetrabromide, chlorofrom, trichloroethylene, bromoform, perchloroethylene, heptane and isooctane.

12. The method according to claim 5 in which the liquid contaminant is aqueous and acidic or aqueous and basic in nature and in which a neutralizing agent is incorporated with the wash in sufficient amount to neutralize the acidic or basic liquid removed from the article.

13. The method according to claim 5 in which the aqueous phase is removed from the separation zone and concentrated to remove water.

14. The method according to claim 5 in which the second liquid has a density greater than that of the first liquid being removed.

15. The method according to claim 14 in which the second liquid is a halogenated hydrocarbon.

16. The method according to claim 15 in which the second liquid is 1,1,2-trichloro-1,2,2-trifluoroethane.

17. The method according to claim 15 in which the second liquid is perchloroethylene.

18. The method according to claim 15 in which the liquid contaminant is aqueous and basic in nature.

19. The method according to claim 15 in which the liquid contaminant is aqueous and acidic in nature.

20. The method according to claim 15 in which the liquid contaminant is an acidic solution.

21. The method according to claim 20 in which the solution is a chromium solution.

22. The method according to claim 20 in which the solution is a copper solution.

23. The method according to claim 15 in which the water wash component present in said second liquid is in an amount between about 1–10 percent by weight of said second liquid.

24. The method according to claim 23 in which the liquid contaminant is a solution.

25. The method according to claim 24 in which the second liquid and water are sprayed through common nozzles onto the non-absorbent article and in which the second liquid entering the separation zone is maintained at a temperature below its boiling point.

26. The method according to claim 23 in which the water miscible liquid contaminant is a copper solution.

27. The method according to claim 26 in which the second liquid and water are sprayed through common nozzles onto the non-absorbent article and in which the second liquid entering the separation zone is maintained at a temperature below its boiling point.

28. The method for removing an aqueous first liquid consisting essentially of water and a water soluble contaminant from a non-absorbent surface which comprises washing said non-absorbent surface possessing said aqueous first liquid with a mixture of:
   a. a second liquid having a different density than said first liquid and in which said first liquid is not over 10 percent soluble by weight of second liquid, and
   b. a first solution miscible with said first liquid and which is a dilution of said first liquid, said first solution being not more than 10 percent soluble in said second liquid by weight of second liquid and being present in said mixture in a percentage greater than the solubility of said first solution in said second liquid thereby displacing said first liquid from said surface.

29. The method according to claim 28 in which step (a) is preceded by washing the article with a solution of the aqueous liquid being removed which washing solution is more dilute than said aqueous liquid being removed.

30. The method of claim 28 in which the solubility of said first liquid in said second liquid is not over 5 percent and the solubility of said first solution in said second liquid is not over 5 percent.

31. The method according to claim 30 in which a plurality of surfaces are treated and which additionally comprises: collecting the displaced first liquid, second liquid and first solution, causing the collected displaced first liquid, second liquid and first solution to separate into an aqueous phase and a second liquid phase in a separation zone; removing from the separaton zone the second liquid phase, and recycling separated second liquid phase as second liquid.

32. The method according to claim 31 which comprises recycling the departed aqueous phase as the first solution.

33. The method of claim 30 wherein subsequent to washing with said mixture, said surface is further washed with a second solution containing less than the maximum concentration of said first liquid which maximum concentration would prevent further removal of said first liquid from said surface.

34. The method according to claim 33 wherein said surface is washed with water subsequent to being washed with said second solution.

35. The method according to claim 34 wherein the surface after being washed by the second solution, is subjected to a second wash treatment with the second solution in a second wash zone before the water wash.

36. The method according to claim 35 in which the second solution is supplied, in whole or in part, from the wash solution from the second wash zone.

37. The method according to claim 36 which is continued until a predetermined concentration of the aqueous liquid being removed is obtained as the separated aqueous phase.

38. The method according to claim 35 in which the second liquid entering the separation zone is maintained at a temperature below its boiling point.

39. The method according to claim 38 in which the second liquid is selected from the group consisting of 1,1,2-trichloro-1,2,2-trifluoroethane, trichloromonofluoromethane, tetrachlorodifluoroethane, monochlorobenzene, dichlorobenzene, trichlorobenzene, trichloroethane, methylene chloride, carbon tetrachloride, carbon tetrabromide, chloroform, trichloroethylene, bromoform, perchloroethylene, heptane and isooctane.

40. The method according to claim 38 in which the second liquid has a density greater than that of the liquid being removed.

41. The method according to claim 40 in which the second liquid is a halogenated hydrocarbon.

42. The method according to claim 41 in which the second liquid is 1,1,2-trichloro-1,2,2-trifluoroethane.

43. The method according to claim 41 in which the solvent is perchloroethylene.

44. The method according to claim 41 in which the liquid contaminant is aqueous and basic in nature.

45. The method according to claim 41 in which the liquid contaminant is aqueous and acidic in nature.

46. The method according to claim 41 in which the aqueous phase removed from the separation zone is concentrated to remove water.

47. The method according to claim 41 in which the liquid contaminant is a solution.

48. The method according to claim 47 in which the solution is a chromium solution.

49. The method according to claim 48 in which the separated aqueous phase is recycled to the chromium solution.

50. The method according to claim 47 in which the is a copper solution.

51. The method according to claim 50 in which the separated aqueous phase is recycled to the copper solution.

* * * * *